US008599538B2

(12) United States Patent
Kondou

(10) Patent No.: US 8,599,538 B2
(45) Date of Patent: Dec. 3, 2013

(54) ELECTRONIC APPARATUS AND POWER-SUPPLY CONTROL APPARATUS AND METHOD

(75) Inventor: Youichi Kondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 12/917,589

(22) Filed: Nov. 2, 2010

(65) Prior Publication Data
US 2011/0043983 A1 Feb. 24, 2011

(30) Foreign Application Priority Data

Apr. 11, 2009 (JP) ................. 2009-253048

(51) Int. Cl.
*G06F 1/16* (2006.01)
(52) U.S. Cl.
USPC ................ 361/679.01; 713/320; 455/343.2; 174/260
(58) Field of Classification Search
USPC ............... 701/41, 45, 48, 29, 70, 38, 103; 713/300, 323, 321, 322, 324, 340, 320; 361/91.5, 101, 106, 694, 695, 696, 361/679.01, 679.54, 679.33, 679.3, 679.37, 361/679.48, 679.49, 679.06, 679.09, 361/679.55; 345/87, 179, 211; 455/41.2, 455/41.1, 343.1, 572, 566, 115.3, 343.2; 174/257, 260, 50, 350, 252, 261, 75 R, 174/45
See application file for complete search history.

(56) References Cited

U.S. PATENT DOCUMENTS

| 2009/0013198 | A1* | 1/2009 | Tanaka et al. | 713/300 |
| 2009/0257164 | A1* | 10/2009 | Ikeuchi et al. | 361/91.5 |
| 2009/0326767 | A1* | 12/2009 | Kamada et al. | 701/48 |
| 2011/0224600 | A1* | 9/2011 | Orlandi | 604/30 |

FOREIGN PATENT DOCUMENTS

| JP | 2002-171321 | 6/2002 |
| JP | 2004-172826 | 6/2004 |
| JP | 2005-184501 | 7/2005 |

OTHER PUBLICATIONS

Japanese Office Action mailed Dec. 4, 2012 for corresponding Japanese Application No. 2009-253048, with Partial English-language Translation.
Chinese Office Action mailed Mar. 13, 2013 for corresponding Chinese Application No. 201010536742.8, with English-language Translation.

* cited by examiner

*Primary Examiner* — Hung Duong
(74) *Attorney, Agent, or Firm* — Fujitsu Patent Center

(57) ABSTRACT

A method of controlling a power supply of an electronic apparatus connected to another electronic apparatus, the method including: electrically connecting a contact part configured to be connected to the other electronic apparatus and a detection unit configured to detect a signal representing a state of the power supply of the other electronic apparatus via the contact part when the power supply of the electronic apparatus is off; electrically disconnecting the contact part and the detection unit when the power supply of the electronic apparatus is on; and controlling the power supply of the electronic apparatus when the signal is detected by the detection unit.

4 Claims, 12 Drawing Sheets

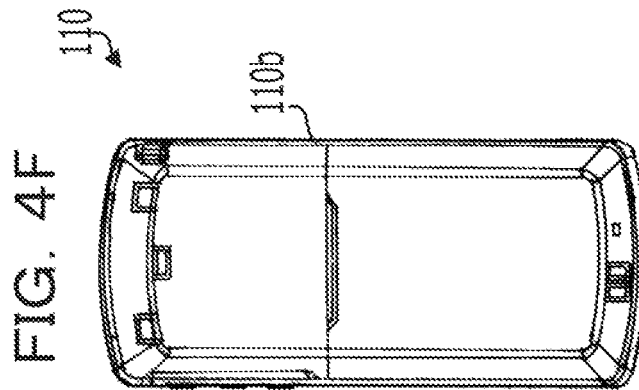
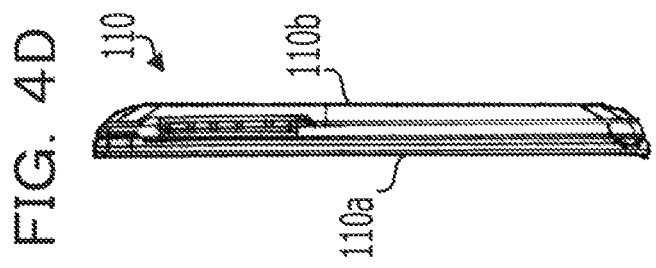
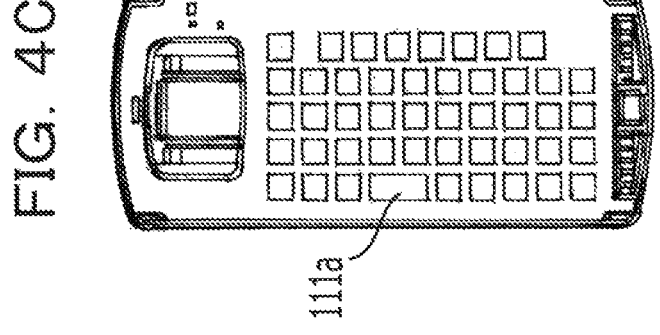
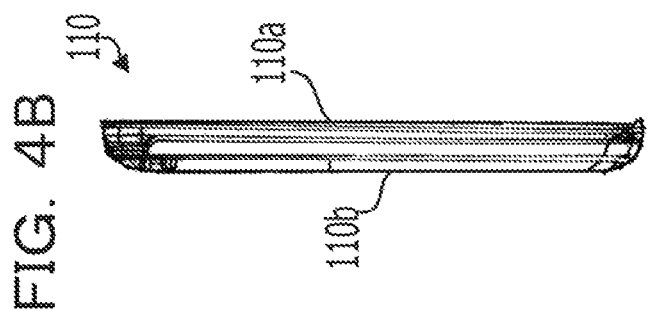

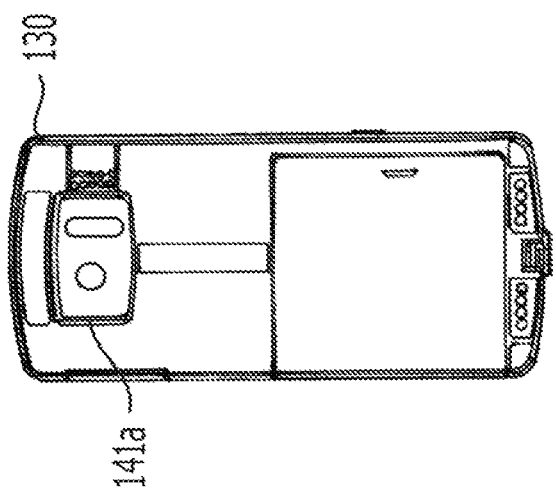
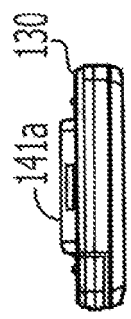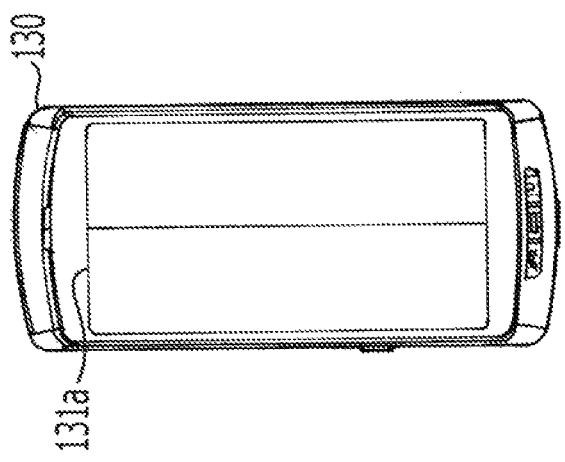
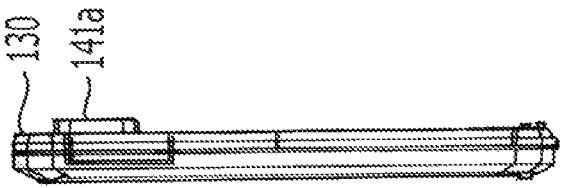
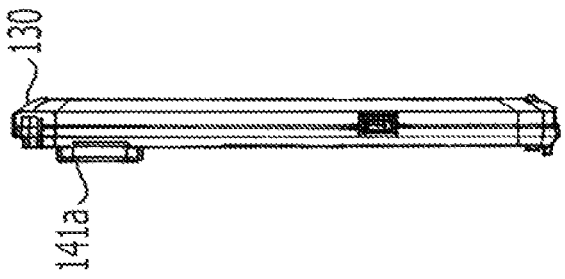

FIG. 6A
FIG. 6B    FIG. 6C    FIG. 6D    FIG. 6F
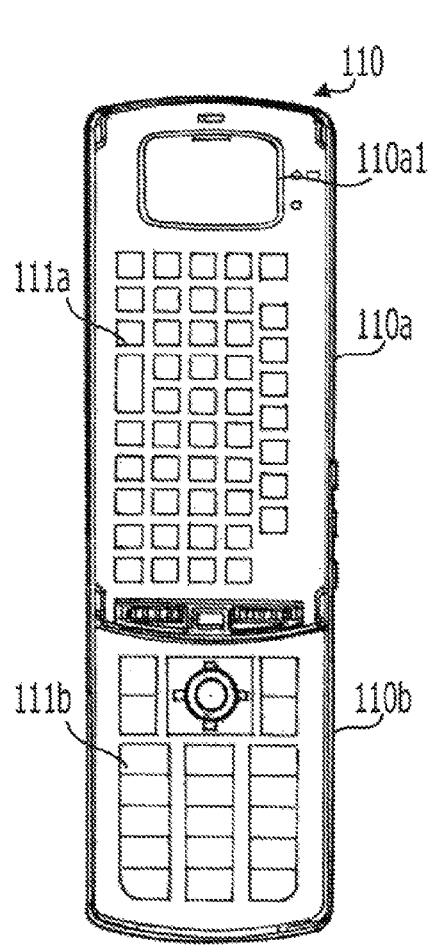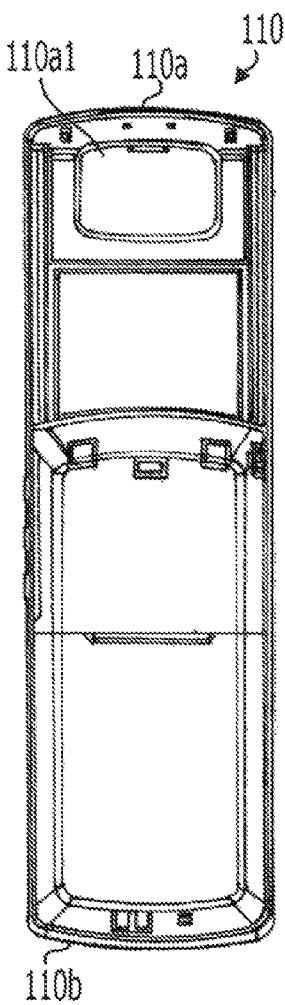
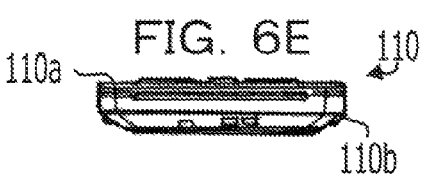
FIG. 6E

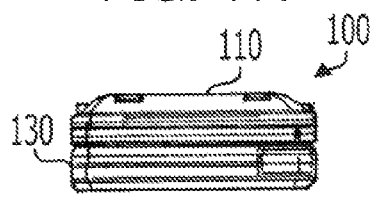
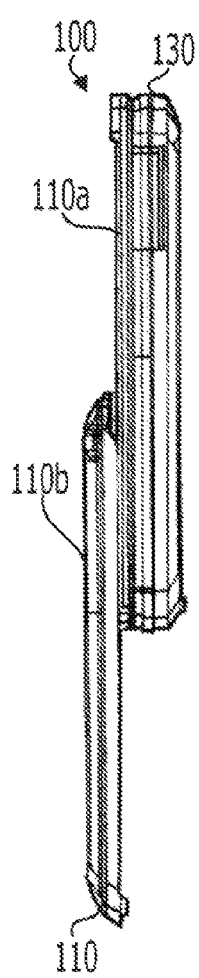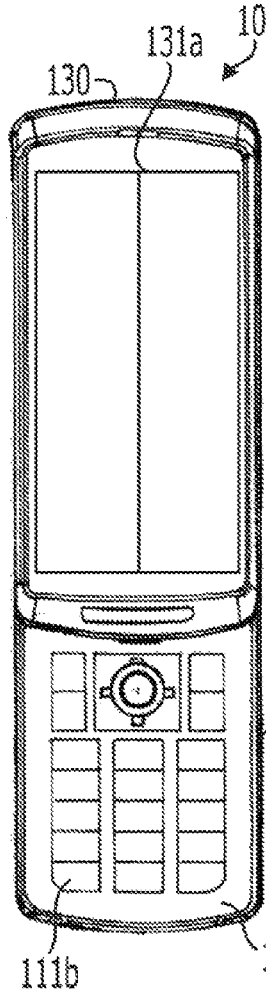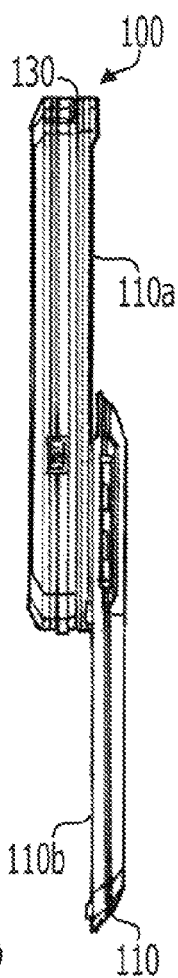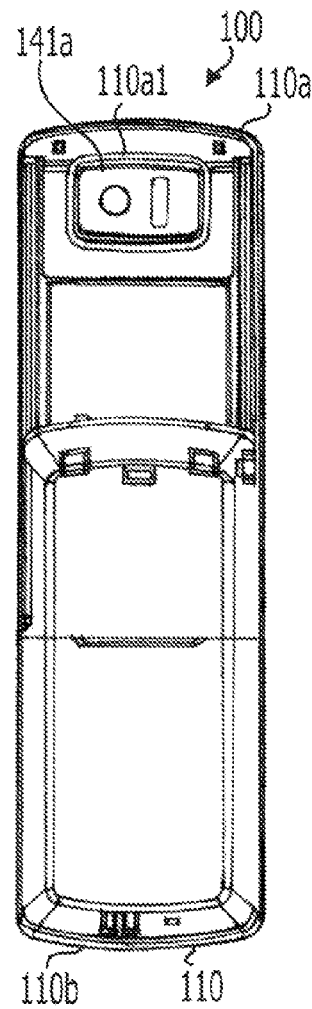
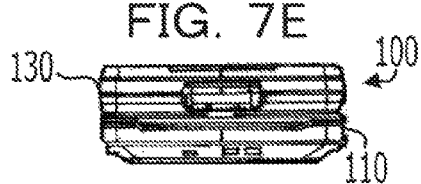

ELECTRONIC APPARATUS AND POWER-SUPPLY CONTROL APPARATUS AND METHOD

CROSS-REFERENCE TO RELATED APPLICATIONS

This application is based upon and claims the benefit of priority of the prior Japanese Patent Application No. 2009-253048, filed on Nov. 4, 2009, the entire contents of which are incorporated herein by reference.

BACKGROUND

1. Field

The present invention relates to an electronic apparatus and a power-supply control apparatus and method.

2. Description of the Related Art

These days, the functionality of electronic apparatuses such as portable terminal apparatuses is progressing.

Some portable terminal apparatuses are able to perform various kinds of information processing, for example, voice phone conversation, document creation, access to web sites, transmission and reception of electronic mail, movie reproduction, and the like.

Furthermore, there are electronic apparatuses that have various different forms so that a user may comfortably use such functions.

In relation to this, there are known mobile phones that have two devices and may be changed such that the devices are in either a coupled state or a separated state in accordance with an application, and that may be used in either of the states, and that may, with a power-supply turn-on operation of one of the devices, turn on the power supply of the other device by using a transmission line between the devices (see, for example, Japanese Unexamined Patent Application Publication No. 2004-172826).

SUMMARY

It is an aspect of the embodiments discussed herein to provide an electronic apparatus including: a second housing and a first housing.

The second housing includes a second contact part configured to output a second notification signal, and a second control unit, in case that the second control unit is electrically connected to the second contact part, that transmits via the second contact part the second notification signal representing the state of the power supply of the second housing.

The first housing includes a first contact part configured to be electrically connected to the second contact part, a first detection unit, in case that the first detection unit is electrically connected to the first contact part, that performs a detection process of the second notification signal that is received from the second control unit via the second contact part and the first contact part, a first path switching unit that selects a first connecting path in which the first contact part is electrically connected to the first detection unit or a first disconnecting path in which the first contact part is not electrically connected to the first detection unit, a first control unit that causes the first path switching unit to select the first connecting path when the power supply of the first housing is off, and that causes the first path switching unit to select the first disconnecting path when the power supply of the first housing is on, and a first power-supply unit that controls the power supply of the first housing on the basis of the second notification signal detected by the first detection unit.

It is also an aspect of the embodiments discussed herein to provide a method of controlling a power supply of an electronic apparatus connected to another electronic apparatus, the method including: electrically connecting a contact part configured to be connected to the other electronic apparatus and a detection unit configured to detect a notification signal representing a state of the power supply of the other electronic apparatus via the contact part when the power supply of the electronic apparatus is off; electrically disconnecting the contact part and the detection unit when the power supply of the electronic apparatus is on; and controlling the power supply of the electronic apparatus when the notification signal is detected by the detection unit.

BRIEF DESCRIPTION OF THE DRAWING

FIGS. 4A, 4B, 4C, 4D, 4E, and 4F illustrate the exterior of an input operation unit of the second embodiment;

FIGS. 5A, 5B, 5C, 5D, 5E, and 5F illustrate the exterior of an information display unit of the second embodiment;

FIGS. 6A, 6B, 6C, 6D, 6E, and 6F illustrate the exterior of the input operation unit in an extended state according to the second embodiment;

FIGS. 7A, 7B, 7C, 7D, 7E, and 7F illustrate the exterior of the portable terminal apparatus in an extended state according to the second embodiment;

DETAILED DESCRIPTION OF THE EMBODIMENTS

Figure 1:
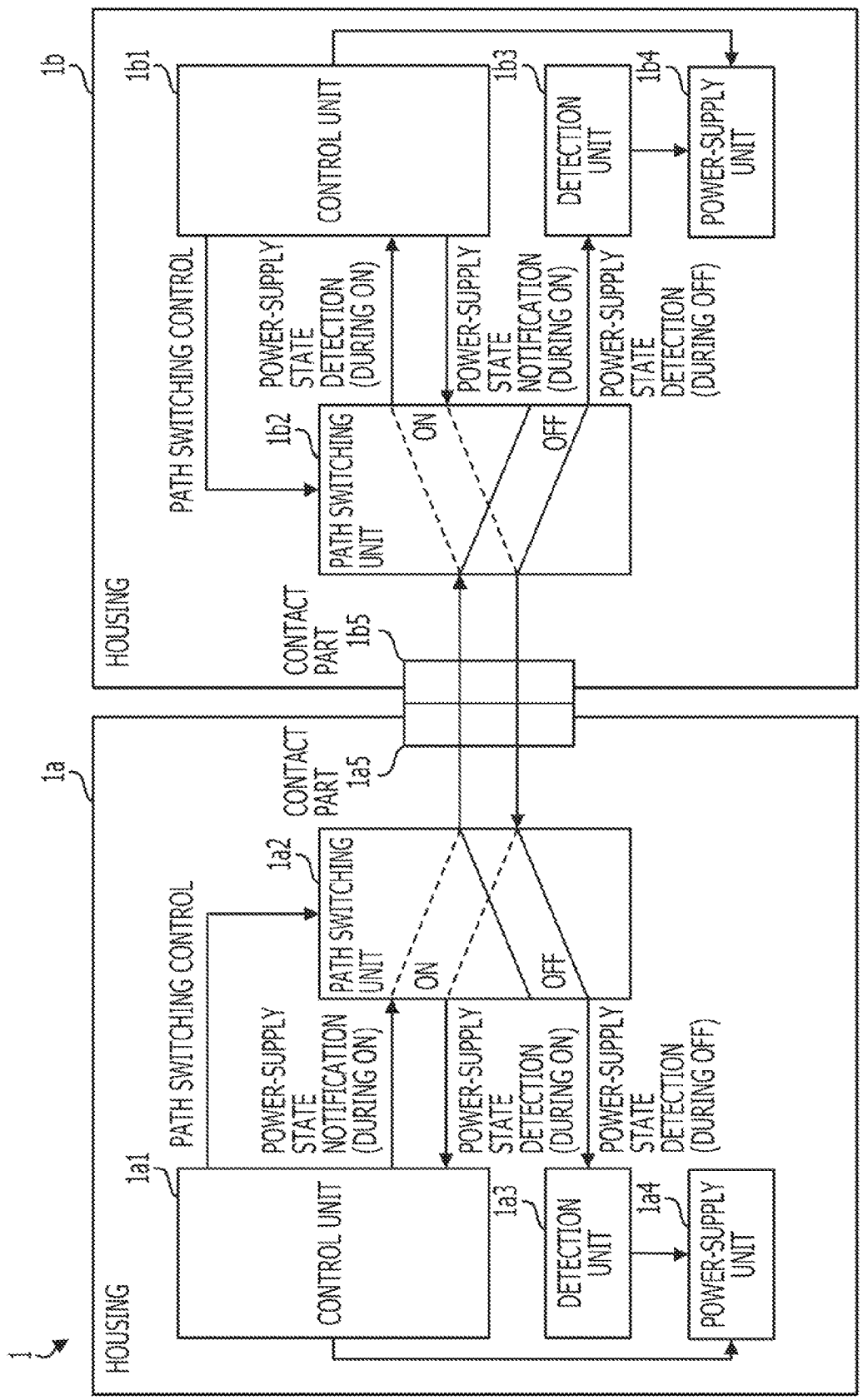
FIG. 1 illustrates an electronic apparatus of a first embodiment.

In electronic apparatuses that may be used in such a separated manner as described above, since there is a possibility that a user will perform a power-supply turn-on operation of switching on the power supply even in the separated state, each device is installed with a power-supply button.

As a result, for the purpose of switching on the power supply, a power-supply turn-on operation, such as pressing of a power-supply button, on each device becomes preferable.

As a result of this, the power-supply turn-on operation for each device involves twice the time and effort for a user when compared to the power-supply turn-on operation of ordinary devices.

Furthermore, there are many cases in which wired contact parts become preferable to realize functions other than the foregoing, such as communication lines used to perform exchange of information between the devices in a coupled state. Thus, there has been a demand for realizing these functions with as small a number of contact parts as possible from the viewpoint of design characteristics.

Furthermore, in the technology disclosed in Japanese Unexamined Patent Application Publication No. 2004-172826 described above, communication is performed from one of the devices to the other device by using a transmission line so as to perform a power-supply turn-on operation.

For this reason, for example, when the power supply of the other device is off, there is a desire to constantly supply electric power to a communication function in preparation for communication of switching on the power supply from one of the devices, presenting the problem that reduction of the amount of standby power is difficult.

In the technology disclosed in the following, it is possible to control, with one of the devices, the power supply of the other device.

For example, an electronic apparatus including a first housing and a second housing is provided.

The first housing includes a first contact part, a first power-supply unit, a first detection unit, a first path switching unit capable of performing switching such that the first contact part and the first detection unit are electrically connected or not electrically connected to each other.

The second housing includes a second contact part that may be electrically connected to the first contact part, and a second control unit, and changes form to a first form in which the second housing is electrically connected to the first housing by the first contact part and the second contact part, and a second form in which the second housing is separated from the first housing.

When the power supply of the first housing is off, the first control unit performs control so that the first path switching unit causes the first contact part and the first detection unit to be electrically connected to each other. When the power supply of the first housing is on, the first control unit performs control so that the first path switching unit causes the first contact part and the first detection unit not to be electrically connected to each other.

The second control unit transmits a second notification signal that notifies the state of the power supply of the second housing.

The first detection unit detects the second notification signal that is received from the second control unit via the second contact part and the first contact part.

When the second notification signal is detected by the first detection unit, the first power-supply unit controls the power supply of the first housing.

Furthermore, for example, there is provided an electronic apparatus connected to another electronic apparatus.

The electronic apparatus includes a contact part that may be electrically connected to the contact part of the other electronic apparatus, a power-supply unit, a detection unit, a path switching unit capable of performing switching such that the contact part and the detection unit are electrically connected or not electrically connected to each other, and a control unit.

Furthermore, the electronic apparatus changes form to a first form in which the electronic apparatus is electrically connected to the other electronic apparatus by the contact part and the contact part of the other electronic apparatus, and a second form in which the other electronic apparatus is separated from the other electronic apparatus.

The control unit performs control so that when the power supply is off, the path switching unit performs switching so as to cause the contact part and the detection unit to be electrically connected to each other, and when the power supply is on, the path switching unit performs switching so as to cause the contact part and the detection unit to be not electrically connected to each other.

The detection unit detects a notification signal that notifies the state of the power supply of the other electronic apparatus, the notification signal being received from the other electronic apparatus via the contact part.

When the detection unit detects the notification signal, the power-supply unit controls the power supply.

Furthermore, for example, there is provided a power-supply control apparatus that controls the power supply of an electronic apparatus connected to another electronic apparatus.

In the power-supply control apparatus, a detection unit detects a notification signal that notifies the state of the power supply of the other electronic apparatus, the notification signal being received via a contact part that may be electrically connected to the other electronic apparatus.

The path switching unit is capable of performing switching such that the contact part and the detection unit are electrically connected or not electrically connected to each other.

The control unit performs control so that when the power supply of the electronic apparatus is off, the path switching unit performs switching so as to cause the contact part and the detection unit to be electrically connected to each other, and when the power supply of the electronic apparatus is on, the path switching unit performs switching so as to cause the contact part and the detection unit not to be electrically connected to each other.

When a notification signal is detected by the detection unit, the power-supply unit controls the power supply of the electronic apparatus.

Furthermore, for example, there is provided a power-supply control method for controlling the power supply of an electronic apparatus connected to another electronic apparatus.

The power-supply control method is formed in such a manner that in a switching control step, when the power supply of the electronic apparatus is off, switching is performed so that a contact part that may be electrically connected to another electronic apparatus, and a detection unit that detects a notification signal for notifying the state of the power supply of the other electronic apparatus, the notification signal being received via a contact part, are electrically connected to each other, and when the power supply of the electronic apparatus is on, switching is performed so that the contact part and the detection unit are not electrically connected to each other.

In a power-supply step, when the notification signal is detected by the detection unit, the power supply of the electronic apparatus is controlled.

(First Embodiment) FIG. 1 illustrates an electronic apparatus of a first embodiment. For example, as an electronic apparatus 1 according to the first embodiment, an electronic apparatus, such as a portable terminal apparatus, a mobile phone, a portable television set, a portable games machine, or an electronic dictionary device, is considered.

Furthermore, an information processing apparatus, such as a notebook computer, smartphone or a personal digital assistant (PDA), is considered.

The electronic apparatus 1 has a housing 1a (first housing) and a housing 1b (second housing).

The housing 1b may be separated from the housing 1a.

The electronic apparatus 1 may be used in either a state in which the housings 1a and 1b are integrated or a state in which they are separated.

Furthermore, each of the housings 1a and 1b has a power supply, such as a battery or a power-supply adaptor, so that they may be independently operated even in a separated state.

The housing 1a includes a control unit 1a1 (first control unit), a path switching unit 1a2 (first path switching unit), a detection unit 1a3 (first detection unit), a power-supply unit 1a4 (first power-supply unit), and a contact part 1a5 (first contact part).

When the power supply of the housing 1a is off, the control unit 1a1 causes the path switching unit 1a2 to perform switching to a first state in which the contact part 1a5 and the detection unit 1a3 are electrically connected to each other.

Furthermore, when the power supply of the housing 1a is on, the control unit 1a1 transmits a notification signal that notifies the state of the power supply of the housing 1a, and causes the path switching unit 1a2 to perform switching to a second state in which the contact part 1a5 and the detection unit 1a3 are not electrically connected to each other, and the contact part 1a5 and the control unit 1a1 are electrically connected to each other.

Here, the description "power supply is off" is assumed to include a standby state in which functions other than functions of operating the power supply on the device itself and monitoring the supply of power to the other device are limited, and the amount of electric power consumption is reduced.

For example, the state in which the power supply is off includes a state in which power is not supplied to the units other than the power-supply unit (for example, the power-supply unit 1a4 and the detection unit 1a3 in the case of the housing 1a) of each device.

The path switching unit 1a2 is capable of performing switching such that the contact part 1a5 and the detection unit 1a3 are electrically connected or not electrically connected to each other.

This makes it possible to prevent the control unit 1a1 and the detection unit 1a3 from being connected to each other.

Furthermore, the path switching unit 1a2 is able to switch between a first state in which the contact part 1a5 and the detection unit 1a3 are electrically connected to each other, and a second state in which the contact part 1a5 and the control unit 1a1 are electrically connected to each other.

As a result, when the power supply of the housing 1a is off, the detection unit 1a3 is connected to the housing 1b, and when the power supply of the housing 1a is on, the control unit 1a1 is connected to the housing 1b.

The detection unit 1a3 detects the notification signal for notifying the state of the power supply of the housing 1b, the notification signal being received from the control unit 1b1 via the contact part 1b5 and the contact part 1a5.

When the notification signal is detected by the detection unit 1a3, the power-supply unit 1a4 controls the power supply of the housing 1a.

As a result, the power supply of the housing 1a is controlled in accordance with the state of the power supply of the housing 1b.

The contact part 1b5 may be electrically connected to the contact part 1a5.

The contact parts 1a5 and 1b5 each may include a connection terminal.

In this case, the contact parts 1a5 and 1b5 are arranged in such a manner that the connection terminals thereof contact each other when the housings 1a and 1b are in an integrated state.

As a result, it becomes possible to perform communication between the housings 1a and 1b.

The housing 1b includes a control unit 1b1 (second control unit), a path switching unit 1b2 (second path switching unit), a detection unit 1b3 (second detection unit), a power-supply unit 1b4 (second power-supply unit), and a contact part 1b5 (second contact part), and changes form to a first form in which the housing 1b is electrically connected to the housing 1a by the contact part 1a5 and the contact part 1b5, and a second form in which the housing 1b is separated from the housing 1a.

When the power supply of the housing 1b is off, the control unit 1b1 switches the path switching unit 1b2 to the first state, and when the power supply of the housing 1b is on, the control unit 1b1 transmits a notification signal for notifying the state of the power supply of the housing 1b, and switches the path switching unit 1b2 to the second state.

The path switching unit 1b2 is capable of performing switching such that the contact part 1b5 and the detection unit 1b3 are electrically connected or not electrically connected to each other.

As a result, when the detection unit 1b3 may detect a notification signal, the detection unit 1b3 may be disconnected from the contact part 1b5, thereby preventing the control unit 1b1 from being connected to the detection unit 1b3.

Furthermore, the path switching unit 1b2 is able to switch between the first state in which the contact part 1b5 and the detection unit 1b3 are electrically connected to each other, and the second state in which the contact part 1b5 and the control unit 1b1 are electrically connected to each other.

As a result, when the power supply of the housing 1b is off, the detection unit 1b3 is connected to the housing 1a, and when the power supply of the housing 1b is on, the control unit 1b1 is connected to the housing 1a.

The detection unit 1b3 detects a first notification signal that is received from the control unit 1a1 via the contact part 1a5 and the contact part 1b5.

When the notification signal is detected by the detection unit 1b3, the power-supply unit 1b4 controls the power supply of the housing 1b.

As a result, the power supply of the housing 1b is controlled in accordance with the state of the power supply of the housing 1a.

The contact part 1b5 may be electrically connected to the contact part 1a5.

As described above, the contact part 1b5 may include a connection terminal.

According to such an electronic apparatus 1, it becomes possible to control, with one of the housings, the power supply of the other housing.

Furthermore, without using a communication function, the states of the power supplies of each other's housings are mutually monitored, and control signals for power-supply control are transmitted and received.

As a result, also, when it is continued to monitor that the power supply of the other housing becomes on while the standby state of one of the housings is maintained, it becomes possible to reduce standby power corresponding to the amount used by the communication function.

In the following second embodiment, as an application example of the electronic apparatus 1 according to the first embodiment, a portable terminal apparatus is given as an example.

However, in the manner described above, the electronic apparatus 1 may be applied to various electronic apparatuses other than the portable terminal apparatus.

Figure 2A:
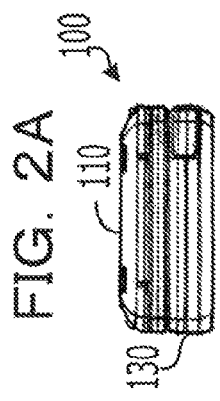
FIGS. 2A, 2B, 2C, 2D, 2E, and 2F illustrate the exterior of a portable terminal apparatus of a second embodiment.

(Second Embodiment) FIGS. 2A, 2B, 2C, 2D, 2E, and 2F illustrate the exterior of a portable terminal apparatus of a second embodiment. FIG. 2A is a top plan view of the portable terminal apparatus of the second embodiment.

Figure 2C:
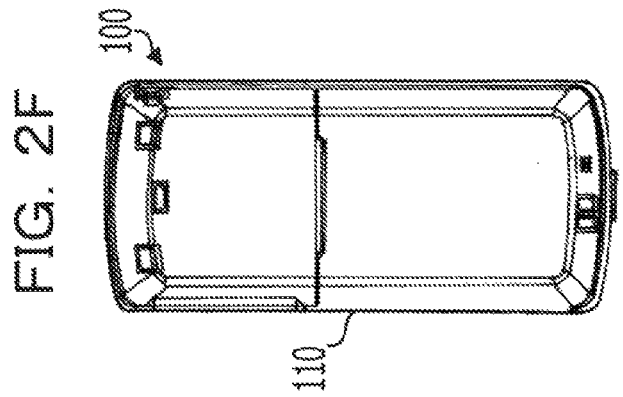
Figure 2E:
Figure 2D:
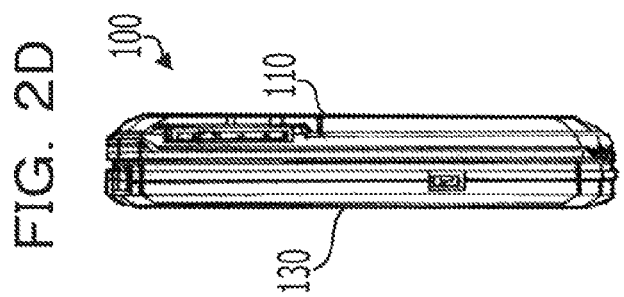
Figure 2F:
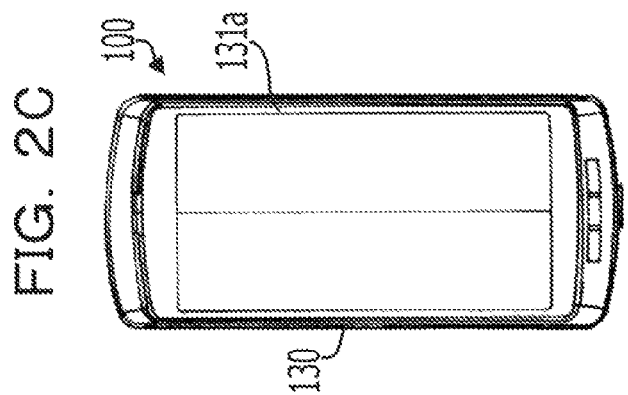
Figure 2B:
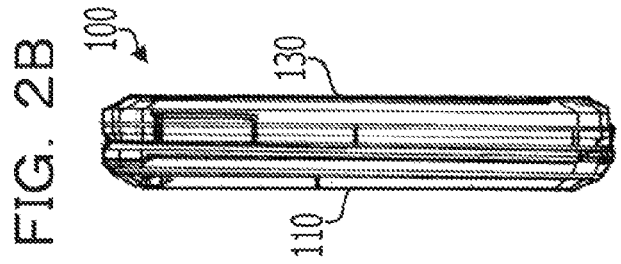

FIG. 2B is a left side view of the portable terminal apparatus of the second embodiment. FIG. 2C is a front view of the portable terminal apparatus of the second embodiment. FIG. 2D is a right side view of the portable terminal apparatus of the second embodiment. FIG. 2E is a bottom view of the portable terminal apparatus of the second embodiment. FIG. 2F is a back view of the portable terminal apparatus of the second embodiment.

A portable terminal apparatus 100 of the second embodiment is a portable terminal apparatus including a phone conversation function using a wireless function.

The portable terminal apparatus 100 includes an input operation unit 110 and an information display unit 130.

The input operation unit 110 is an example of the housing 1a of the first embodiment, and the information display unit 130 is an example of the housing 1b of the first embodiment.

In the portable terminal apparatus 100 illustrated in FIGS. 2A to 2F, the input operation unit 110 and the information display unit 130 are integrated in such a manner as to overlap each other.

The input operation unit 110 is in a housed state in which the input operation unit 110 is not extended but is retracted, as will be described later in FIGS. 2A to 2F.

The length (height) of the input operation unit 110 in the longitudinal direction and the length (width) in the widthwise direction are almost equal to the height and the width of the information display unit 130, respectively.

In this housed state, the side surface of the input operation unit 110 and the side surface of the information display unit 130 when they are integrated are almost aligned.

As illustrated in FIG. 2C, the information display unit 130 has a display panel 131a on the front side thereof.

Figure 3B:
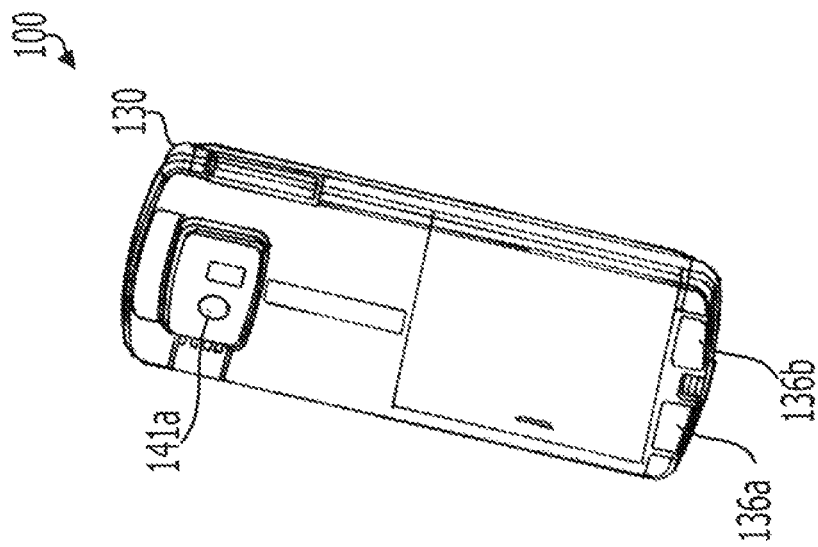
FIGS. 3A and 3B illustrate the exterior of a portable terminal apparatus in a separated state according to the second embodiment.
Figure 3A:
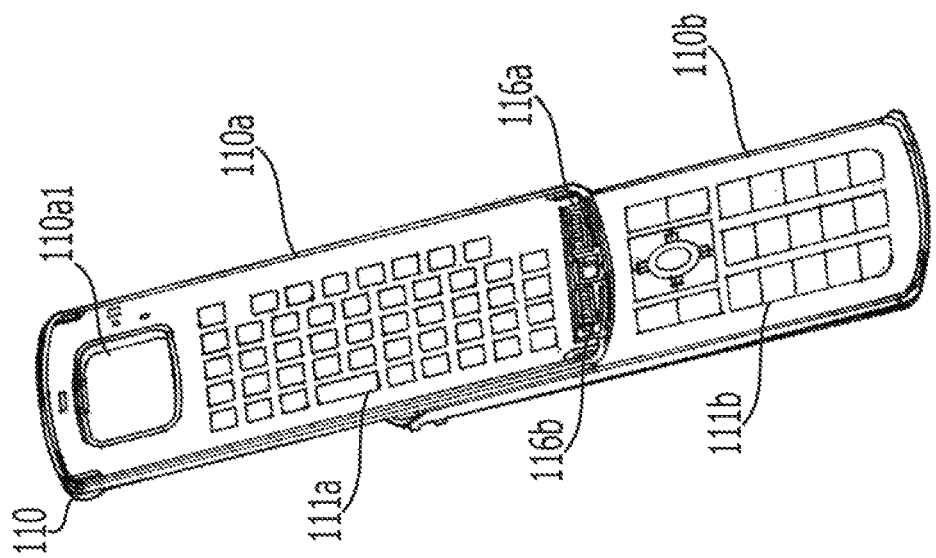

FIGS. 3A and 3B illustrate the exterior of the portable terminal apparatus in a separated state according to the second embodiment. FIG. 3A is an exterior view of an input operation unit of the second embodiment. FIG. 3B is an exterior view of an information display unit of the second embodiment. In the portable terminal apparatus 100 according to the present embodiment, the input operation unit 110 and the information display unit 130 may be used independently of each other also in a state in which they are separated from each other. FIGS. 3A and 3B illustrate the input operation unit 110 and the information display unit 130 in a separated state, respectively.

As illustrated in FIG. 3A, the input operation unit 110 includes a full-key unit 110a and a ten-key unit 110b.

By causing the full-key unit 110a to slide from the ten-key unit 110b, the input operation unit 110 is able to switch between a housed state in which the ten-key unit 110b is housed and an extended state in which the ten-key unit 110b is exposed.

The full-key unit 110a includes a fitting hole 110a1 that fits into a camera unit 141a of the information display unit 130, full keys 111a from which character information is mainly input, and connection terminals 116a and 116b that may be electrically connected to connection terminals 136a and 136b by being brought into contact with the connection terminals 136a and 136b possessed by the information display unit 130, respectively.

The ten-key unit 110b includes ten keys 111b from which numerical information and operation of a telephone function are mainly input.

In the present embodiment, the full keys 111a are housed inside the portable terminal apparatus 100 in a state in which the input operation unit 110 and the information display unit 130 of the portable terminal apparatus 100 are integrated. When the portable terminal apparatus 100 is separated into the input operation unit 110 and the information display unit 130, the full keys 111a become exposed and usable.

Furthermore, when the portable terminal apparatus 100 is separated into the input operation unit 110 and the information display unit 130, and the input operation unit 110 is made to slide, the ten keys 111b become exposed and usable.

As illustrated in FIG. 3B, the information display unit 130 includes a camera unit 141a that captures a still image or a moving image, and connection terminals 136a and 136b that may be electrically connected to the connection terminals 116a and 116b possessed by the input operation unit 110 by being brought into contact thereto, respectively.

When the input operation unit 110 and the information display unit 130 are integrated as will be described later, the camera unit 141a fits into the fitting hole 110a1 possessed by the input operation unit 110.

FIGS. 4A, 4B, 4C, 4D, 4E, and 4F illustrate the exterior of an input operation unit of the second embodiment. FIG. 4A is a top plan view of the input operation unit of the second embodiment. FIG. 4B is a left side view of the input operation unit of the second embodiment. FIG. 4C is a front view of the input operation unit of the second embodiment. FIG. 4D is a right side view of the input operation unit of the second embodiment. FIG. 4E is a bottom view of the input operation unit of the second embodiment. FIG. 4F is a back view of the input operation unit of the second embodiment.

The input operation unit 110 illustrated in FIGS. 4A to 4F is in a housed state in which the full keys 111a of the full-key unit 110a are exposed separately from the information display unit 130, and the full keys 111a house the ten keys 111b of the ten-key unit 110b.

As illustrated in FIGS. 4A to 4F, when the input operation unit 110 is separated from the information display unit 130, and is in a housed state, the user of the portable terminal apparatus 100 may input character information or the like by using the full keys 111a.

Furthermore, the input information is transmitted to the information display unit 130 by using a wireless communication function (to be described later).

FIGS. 5A, 5B, 5C, 5D, 5E, and 5F illustrate the exterior of an information display unit of the second embodiment. FIG. 5A is a top plan view of the information display unit of the second embodiment. FIG. 5B is a left side view of the information display unit of the second embodiment. FIG. 5C is a front view of the information display unit of the second embodiment. FIG. 5D is a right side view of the information display unit of the second embodiment. FIG. 5E is a bottom view of the information display unit of the second embodiment. FIG. 5F is a back view of the information display unit of the second embodiment.

The information display unit 130 illustrated in FIGS. 5A to 5F is separated from the input operation unit 110, with a display panel 131a being arranged on the front side thereof and a camera unit 141a being arranged on the back side thereof.

As illustrated in FIGS. 5A to 5F, when the information display unit 130 is separated from the input operation unit 110, it is possible for the user of the portable terminal apparatus 100 to display, on the display panel 131a, information possessed by the portable terminal apparatus 100, such as information obtained by the portable terminal apparatus 100 by using a communication function and information input through the input operation unit 110.

Furthermore, it is possible for the user to capture a still image or a moving image by using the camera unit 141a.

FIGS. 6A, 6B, 6C, 6D, 6E, and 6F illustrate the exterior of an input operation unit of the second embodiment in an extended state. FIG. 6A is a top plan view of the input operation unit of the second embodiment in an extended state. FIG. 6B is a left side view of the input operation unit of the second embodiment in an extended state. FIG. 6C is a front view of the input operation unit of the second embodiment in an extended state. FIG. 6D is a right side view of the input operation unit of the second embodiment in an extended state. FIG. 6E is a bottom view of the input operation unit of the second embodiment in an extended state. FIG. 6F is a back view of the input operation unit of the second embodiment in an extended state.

The input operation unit 110 illustrated in FIGS. 6A to 6F is in an extended state in which the full keys 111a of the full-key unit 110a are exposed, the input operation unit 110 is separated from the information display unit 130, the full-key unit 110a and the ten-key unit 110b are made to slide so as to be extended, and the ten keys 111b of the ten-key unit 110b are also exposed.

The input operation unit 110 may be provided with, for example, a rail unit (not illustrated) so as to switch between an extended state and a housed state by sliding the ten-key unit 110b.

Furthermore, the input operation unit 110 is not limited to this, and the switching of the state by the sliding of the ten-key unit 110b may be realized by another mechanism.

As illustrated in FIGS. 6A to 6F, when the input operation unit 110 is separated from the information display unit 130 and in an extended state, it is possible for the user of the portable terminal apparatus 100 to input character information or the like by using the full keys 111a, and also operate the mobile phone function and input numerical information by operating the ten keys 111b.

Furthermore, the input information is transmitted to the information display unit 130 by using a wireless communication function (to be described later).

FIGS. 7A, 7B, 7C, 7D, 7E, and 7F illustrate the exterior of a portable terminal apparatus of the second embodiment in an extended state. FIG. 7A is a top plan view of the portable terminal apparatus of the second embodiment in an extended state. FIG. 7B is a left side view of the portable terminal apparatus of the second embodiment in an extended state. FIG. 7C is a front view of the portable terminal apparatus of the second embodiment in an extended state. FIG. 7D is a right side view of the portable terminal apparatus of the second embodiment in an extended state. FIG. 7E is a bottom view of the portable terminal apparatus of the second embodiment in an extended state. FIG. 7F is a back view of the portable terminal apparatus of the second embodiment in an extended state.

The portable terminal apparatus 100 illustrated in FIGS. 7A to 7F is in an extended state in which the input operation unit 110 and the information display unit 130 are integrated, and the full-key unit 110a and the ten-key unit 110b of the input operation unit 110 are made to slide to expose the ten keys 111b.

As illustrated in FIG. 7F, when the portable terminal apparatus 100 is in an extended state, as a result of the camera unit 141a being fitted to the fitting hole 110a1 of the input operation unit 110, the camera unit 141a is exposed through the fitting hole 110a1 in spite of the fact that the input operation unit 110 and the information display unit 130 have been integrated.

As illustrated in FIGS. 7A to 7F, when the portable terminal apparatus 100 has been integrated in an extended state, it is possible for the user of the portable terminal apparatus 100 to operate the ten keys Mb so as to operate the mobile phone function and input numerical information, and to capture a still image or a moving image by using the camera unit 141a.

Furthermore, the information input by the input operation unit 110 is transmitted to the information display unit 130 via the connection terminals 116a, 116b, 136a, and 136b.

Figure 8:
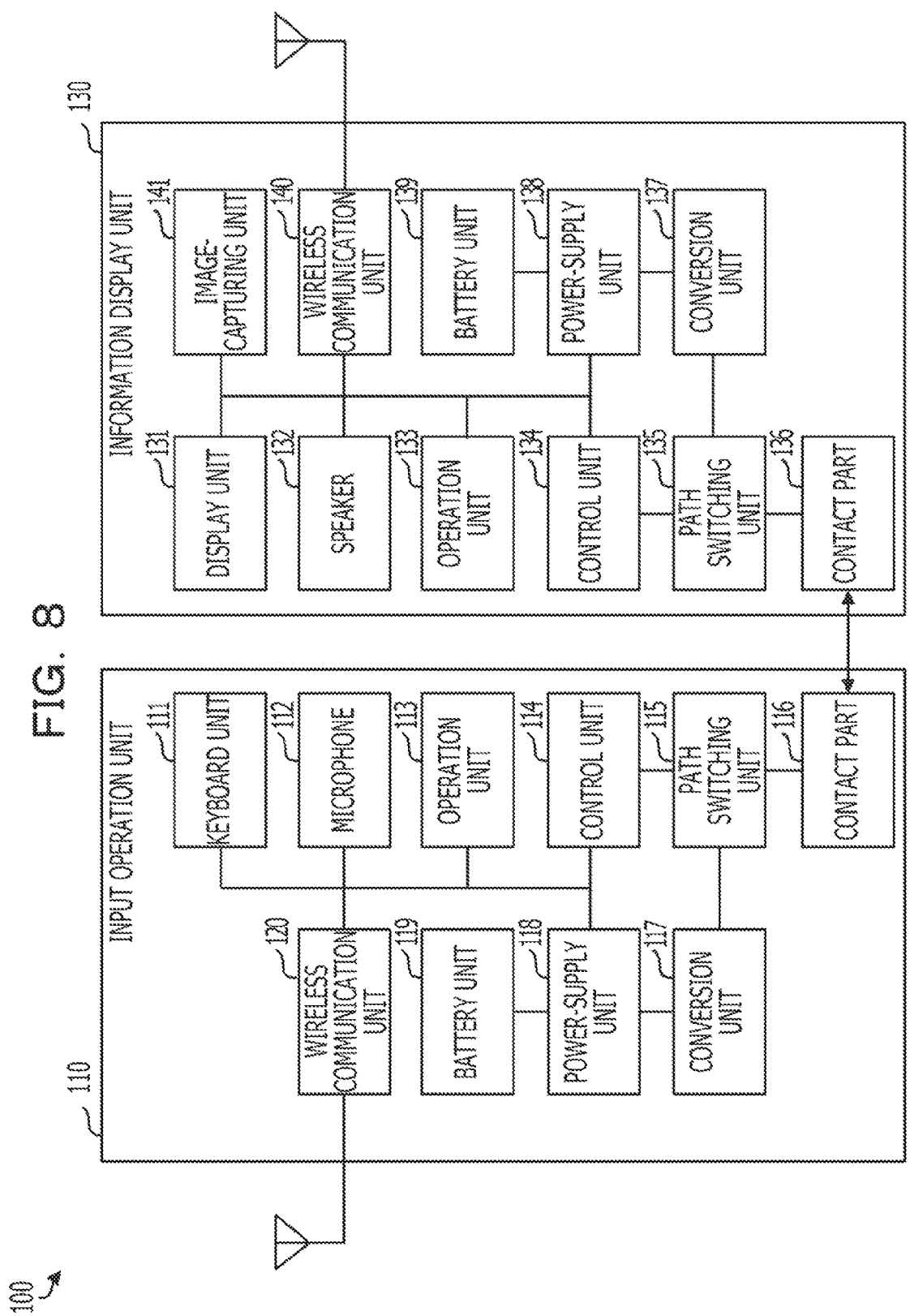
FIG. 8 is a block diagram illustrating the hardware of the portable terminal apparatus of the second embodiment.

FIG. 8 is a block diagram illustrating the hardware of the portable terminal apparatus of the second embodiment.

As described above, the portable terminal apparatus 100 according to the second embodiment includes the input operation unit 110 and the information display unit 130.

It is possible for the input operation unit 110 and the information display unit 130 to perform contact communication and wireless communication because of various control including the control of the power supply of each device.

Furthermore, the input operation unit 110 and the information display unit 130 may also be used singly.

The input operation unit 110 includes a keyboard unit 111, a microphone 112, an operation unit 113, a control unit 114, a path switching unit 115, a contact part 116, a conversion unit 117, a power-supply unit 118, a battery unit 119, and a wireless communication unit 120.

The keyboard unit 111 includes the full keys 111a and the ten keys 111b described above, and is used to detect key operation of these keys so as to accept input numerical information, character information, and other input information.

When key operation is detected, the keyboard unit 111 outputs an input signal indicating the operated key to the control unit 134 via the control unit 114.

The microphone 112 converts physical vibrations of sound into an electrical signal, receives audio input, and outputs the electrical signal to the control unit 134 via the control unit 114.

For example, when the user is making phone conversation, the voice of the user and the background noise on the user side are input from the microphone 112.

The operation unit 113 has an input device including operation keys, operation buttons, a touch panel, and the like, and accepts operation, such as switching on/off of the power supply and switching of various modes.

The control unit 114 controls the entire portable terminal apparatus 100.

The control unit 114 may be realized using, for example, a central processing unit (CPU), a random access memory (RAM), and a read only memory (ROM).

Furthermore, the control unit 114 includes an interface through which connection may be made to peripheral devices, such as, for example, an inter-integrated circuit (12C), a serial peripheral interface (SPI), a universal asynchronous receiver transmitter (UART), or a universal serial bus (USB).

The CPU reads programs and data from the ROM, develops them in the RAM, and executes a program.

The RAM is a volatile memory for temporarily storing a program and at least a portion of data.

In place of the RAM, another kind of memory may be used.

The ROM is a non-volatile memory for storing programs and data that are used by the control unit 114.

In place of the ROM, for example, a flash memory may be used.

Control performed by the control unit 114 includes communication control, audio input/output control, key operation control, and the like.

The path switching unit 115 switches the connection destination of the contact part 116 between the control unit 114 and the power-supply unit 118.

As a result, the signal communicated between the input operation unit 110 and the information display unit 130 may be switched between a data signal that is transmitted or received by the interface that may be connected to the peripheral devices of the control unit 114 and a signal for controlling the power supply, the signal being transmitted or received by the power-supply unit 118.

Under the control of the control unit 114, the path switching unit 115 switches between a data line and a line for a power-supply turn-on signal in response to the power-supply state of the input operation unit 110.

The switching of the path by the path switching unit 115 may be performed in accordance with, for example, the presence or absence of the control signal transmitted from the control unit 114.

By making the line of the power-supply turn-on signal operative by the path switching unit 115 when the power supply of the input operation unit 110 is off, it is possible to detect the power-supply turn-on signal from the information display unit 130.

The contact part 116 is electrically connected to the contact part 136 possessed by the information display unit 130.

The data communicated with the information display unit 130 and the signal for controlling the power supply with the information display unit 130 via the contact part 116 are communicated with the information display unit 130 via the contact part 116.

The contact part 116 includes connection terminals 116a and 116b (illustrated in FIG. 3A) for performing contact communication with the information display unit 130.

The connection terminals 116a and 116b are made to protrude a little from the surface of the input operation unit 110 so that the connection terminals 116a and 116b easily contact the connection terminals 136a and 136b (illustrated in FIG. 3B) of the contact part 136 possessed by the information display unit 130, respectively.

Furthermore, the periphery of the connection terminals 116a and 116b of the contact part 116 may be made to be depressed, and the contact part 136 may be made to protrude, so that the contact part 116 fits into the contact part 136 and the respective connection terminals contact each other.

The conversion unit 117 is a logic circuit that converts the power-supply turn-on signal transmitted from the control unit 134 into a form of signal that may be received by a detection unit possessed by the power-supply unit 118.

When the power supply of the input operation unit 110 is on, the power-supply unit 118 supplies power to each unit of the input operation unit 110, and when the power supply thereof is off, the power-supply unit 118 stops supply of power.

The control of the state of the power supply by the power-supply unit 118 is performed in accordance with the detection of the power-supply turn-on signal by the detection unit possessed by the power-supply unit 118.

The battery unit 119 has a secondary battery (storage battery) in which electricity is stored by performing charging from a commercial power supply or the like and may be used repeatedly as a battery, with electric power being supplied to the input operation unit 110 by the secondary battery.

For the battery, a lithium ion battery is used in the present embodiment. The battery is not limited to this, and any secondary battery may be used.

The wireless communication unit 120 performs wireless communication with the information display unit 130 under the control of the control unit 114.

For the wireless communication unit 120, for example, a communication method, such as Bluetooth (registered trademark), Zigbee, Wireless USB, or a wireless local area network (LAN), may be used.

The information display unit 130 includes a display unit 131, a speaker 132, an operation unit 133, a control unit 134, a path switching unit 135, a contact part 136, a conversion unit 137, a power-supply unit 138, a battery unit 139, a wireless communication unit 140, and an image-capturing unit 141.

Under the control of the control unit 134, the display unit 131 performs various notifications to the user by turning on various lamps or by displaying various images on a display panel 131a.

For the display unit 131, examples of various lamps that may be used include a light emitting diode (LED).

Furthermore, for the display unit 131, examples of the display panel 131a that may be used include a liquid-crystal display (LCD) and an organic electro luminescence (EL) display.

Examples of images displayed on the display panel 131a include a standby screen, an operation screen, text, and content images.

The speaker 132 converts an electrical signal into physical vibrations so as to reproduce sound under the control of the control unit 134.

For example, while the user is making phone conversation, the voice of the phone conversation partner and background noise on the phone conversation partner side are output from the speaker 132.

The operation unit 133 has an input device including operation keys, operation buttons, and a touch panel, and the like, and is used to, for example, switch on/off the power supply and switch between various modes.

The control unit 134 controls the portable terminal apparatus 100.

Similarly to the control unit 114, the control unit 134 may be realized using, for example, a CPU, a RAM, and a ROM.

Furthermore, the control unit 134 has an interface, such as, for example, I2C, SPI, UART, and USB, which enables connection with peripheral devices.

The CPU reads a program and data from the ROM, develops them in the RAM, and executes a program.

The RAM is a volatile memory for temporarily storing a program and at least a portion of data.

In place of the RAM, another kind of memory may be used.

The ROM is a non-volatile memory for storing a program and data used by the control unit 134.

In place of the ROM, for example, a flash memory may be used.

Examples of control performed by the control unit 134 include communication control, audio input/output control, and key operation control.

The path switching unit 135 switches the connection destination of the contact part 136 between the control unit 134 and the power-supply unit 138.

As a result, the signal communicated between the input operation unit 110 and the information display unit 130 may be switched between a data signal that is transmitted or received by the interface that enables connection with the peripheral devices of the control unit 134, and a signal for controlling the power supply, the signal being transmitted or received by the power-supply unit 138.

Under the control of the control unit 134, the path switching unit 135 switches between a data line and a line for the power-supply turn-on signal in response to the power-supply state of the information display unit 130.

The switching of the path by the path switching unit 135 may be performed in accordance with, for example, the presence or absence of the control signal transmitted from the control unit 134.

When the power supply of the information display unit 130 is off, by making the line of the power-supply turn-on signal operative by the path switching unit 135, it is possible to detect the power-supply turn-on signal from the information display unit 130.

The contact part 136 is used to make an electrical connection with the contact part 116 possessed by the input operation unit 110.

The data communicated between the information display unit 136 and the input operation unit 110 and the signal for controlling the power supply with the input operation unit 110 are communicated via the contact part 136.

The contact part 136 includes the connection terminals 136a and 136b for performing contact communication with the input operation unit 110.

The connection terminals 136a and 136b are made to protrude a little from the surface of the information display unit 130 so that the connection terminals 136a and 136b may easily contact the connection terminals 116a and 116b of the contact part 116 possessed by the input operation unit 110, respectively.

Furthermore, the periphery of the connection terminals 136a and 136b of the contact part 136 may be made to be depressed, and the contact part 116 may be made to protrude, so that the contact part 136 fits into the contact part 116, and the respective connection terminals contact each other.

The conversion unit 137 is a logic circuit that converts the power-supply turn-on signal transmitted from the control unit 114 into a form of signal that may be received by the detection unit possessed by the power-supply unit 138.

When the power supply of the information display unit 130 is on, the power-supply unit 138 supplies power to each unit of the information display unit 130, and when the power supply thereof is off, the power-supply unit 138 stops supply of power.

The control of the state of the power supply by the power-supply unit 138 is performed in accordance with the detection of the power-supply turn-on signal by the detection unit possessed by the power-supply unit 138.

The battery unit 139 has a secondary battery that may be repeatedly used as a battery in which electricity is stored by performing charging from a commercial power supply or the like, with electric power being supplied to the information display unit 130 by the secondary battery.

For the battery, a lithium ion battery is used in the present embodiment. The battery is not limited to this, and any secondary battery may be used.

The wireless communication unit 140 performs wireless communication with the input operation unit 110 under the control of the control unit 134.

Furthermore, the wireless communication unit 140 performs wireless communication through a public line under the control of the control unit 134.

For the wireless communication with the input operation unit 110, the wireless communication unit 140 may use a communication method, such as, for example, Bluetooth, Zigbee, Wireless USB, or wireless LAN.

Furthermore, in wireless communication through a public line, the wireless communication unit 140 may directly make communication by, for example, mobile communication, such as W-CDMA communication, or may make communication via a wireless LAN, such as IEEE 802.11a/b/g/n.

The image-capturing unit 141 includes a camera unit 141a, and converts a still image or a moving image captured using the camera unit 141a into image data.

Furthermore, the input operation unit 110 and the information display unit 130 include power-supply units 118 and 138 and battery units 119 and 139, respectively, so that they may be operated independently even in a separated state.

Here, the description "power supply is off" is assumed to include a standby state in which functions other than functions of operating the power supply on the device itself and monitoring the power supply of the other device are limited and the amount of electric power consumption is reduced, for example, when the state in which the power supply is off includes a state in which no power is supplied to each unit other than the power-supply unit (for example, the power-supply unit 118 in the case of the input operation unit 110) of each device.

Figure 9:
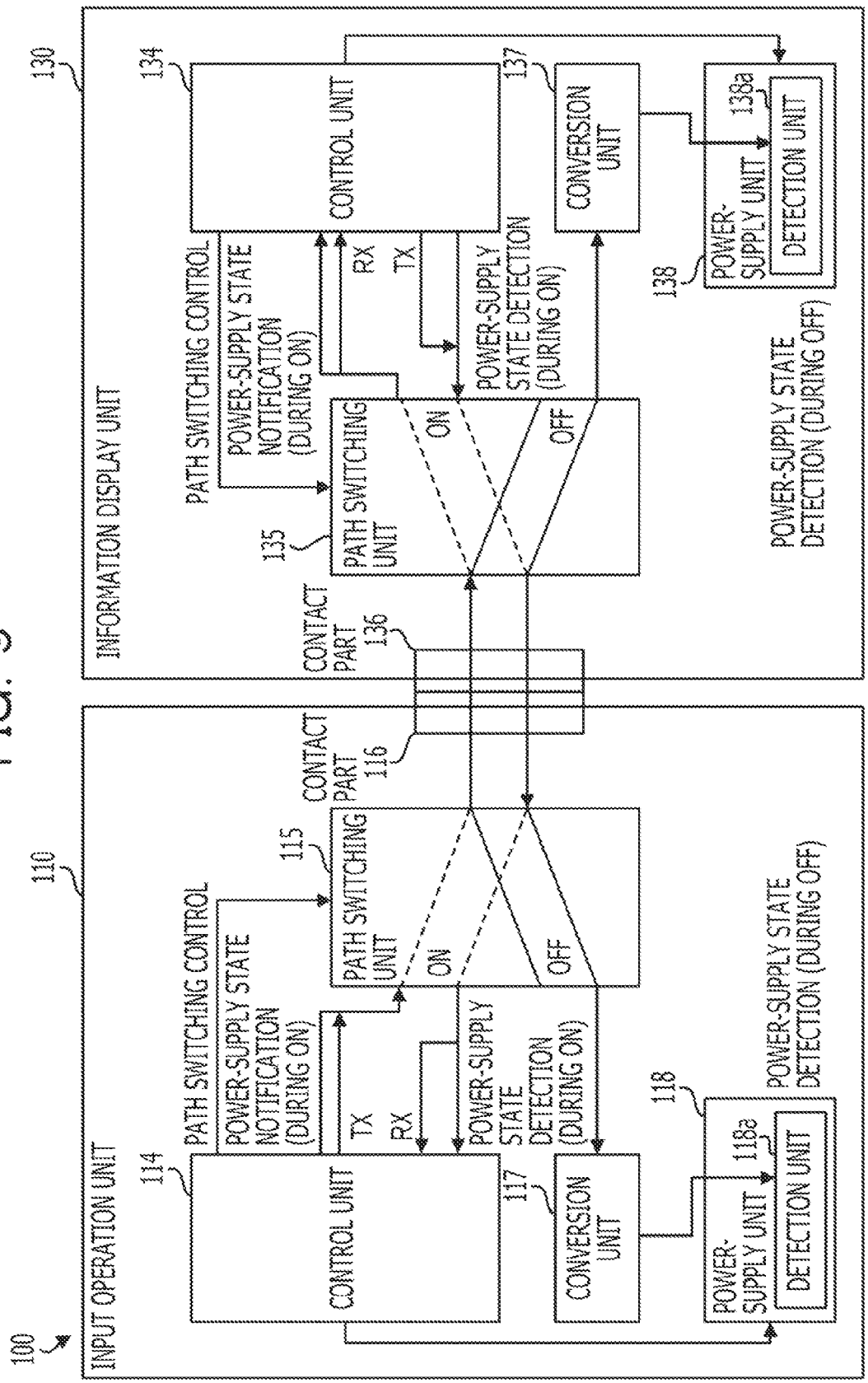
FIG. 9 is a block diagram illustrating functions of the portable terminal apparatus of the second embodiment.

FIG. 9 is a block diagram illustrating the functions of the portable terminal apparatus of the second embodiment.

In FIG. 9, descriptions of the functions of other than power-supply control are omitted.

The portable terminal apparatus 100 includes an input operation unit 110 (first housing) and an information display unit 130 (second housing).

The information display unit 130 may be separated from the input operation unit 110.

The portable terminal apparatus 100 may be used in either a state in which the input operation unit 110 and the information display unit 130 are integrated or a state in which they are separated from each other.

When the power supply of the input operation unit 110 is off, the control unit 114 causes the path switching unit 115 to perform switching such that the contact part 116 and the detection unit 118a are electrically connected to each other.

Furthermore, when the power supply of the input operation unit 110 is on, the control unit 114 transmits a power-supply turn-on signal for notifying that the power supply of the input operation unit 110 is on, and causes the path switching unit 115 to perform switching such that the contact part 116 and the detection unit 118a are not electrically connected to each other and the contact part 116 and the control unit 114 are electrically connected to each other.

The power-supply turn-on signal functions as a notification signal.

Furthermore, the control unit 114 detects the power-supply turn-on signal for notifying that the power supply of the information display unit 130 is on, the information being transmitted from the control unit 134 via the contact part 136 and the contact part 116.

When the power supply of the input operation unit 110 is on and the communication is stopped, the control unit 114 transmits a power-supply turn-on signal for notifying that the power supply of the input operation unit 110 is on via a communication line, and detects a power-supply turn-on signal for notifying that the power supply of the information display unit 130 is on.

As a result, it is possible for the input operation unit 110 and the information display unit 130 to notify the states of each other's power supplies and confirm the states of each other's power supplies.

The path switching unit 115 is capable of performing switching such that the contact part 116 and the detection unit 118a are electrically connected or not electrically connected to each other.

As a result, when it is not desired for the detection unit 118a to detect the power-supply turn-on signal, since the detection unit 118a is disconnected from the contact part 116, it is possible to prevent the control unit 114 and the detection unit 118a from being connected to each other.

Furthermore, the path switching unit 115 is able to switch between a state in which the contact part 116 and the detection unit 118a are electrically connected to each other and a state in which the contact part 116 and the control unit 114 are electrically connected to each other.

As a result, when the power supply of the input operation unit 110 is off, the detection unit 118a is connected to the information display unit 130, and when the power supply of the input operation unit 110 is on, the control unit 114 is connected to the information display unit 130.

The operation of the path switching unit 115 will be described later with reference to FIGS. 10 and 11.

The contact part 116 may be electrically connected to the contact part 136.

The contact parts 116 and 136 each have connection terminals.

The contact parts 116 and 136 are arranged in such a manner that their respective connection terminals are brought into contact with each other when the input operation unit 110 and the information display unit 130 are in an integrated state.

As a result, communication becomes possible between the input operation unit 110 and the information display unit 130.

Furthermore, the contact parts 116 and 136 make common use of a communication line used for communication between the input operation unit 110 and the information display unit 130.

As a result, it is possible to simplify contact parts and connection lines between the input operation unit 110 and the information display unit 130 of the portable terminal apparatus 100.

The conversion unit 117 converts the power-supply turn-on signal that is transmitted from the control unit 134 as described above into a form of signal that may be received by the detection unit 118a.

When the power-supply turn-on signal for notifying that the power supply of the information display unit 130 is on is detected by the detection unit 118a, the power-supply unit 118 switches on the power supply of the input operation unit 110.

As a result, the power supply of the input operation unit 110 is controlled in accordance with the state of the power supply of the information display unit 130.

Furthermore, the power-supply unit 118 includes a detection unit 118a.

The power-supply unit 118 is not limited to this, and the detection unit 118a may be provided independently of the power-supply unit 118.

Furthermore, when at least one of the power-supply turn-on signal for notifying that the power supply of the information display unit 130 is on and the power-supply operation signal is detected by the detection unit 118a, the power-supply unit 118 switches on the power supply of the input operation unit 110.

When the power-supply turn-on signal for notifying that the power supply of the information display unit 130 is on is not detected by the control unit 114, the power-supply unit 118 switches off the power supply of the input operation unit 110.

Furthermore, when the power-supply turn-on signal for notifying that the power supply of the information display unit 130 is on is detected by the control unit 114, the power-supply unit 118 maintains the power supply of the input operation unit 110 to be on.

As a result, it is possible for the input operation unit 110 and the information display unit 130 to confirm the states of each other's power supplies and control the states of the power supplies in accordance with the confirmation result.

When the power supply of the input operation unit 110 is off and the communication is stopped, the detection unit 118a detects the power-supply turn-on signal for notifying that the power supply of the information display unit 130 is on, the power-supply turn-on signal being received from the control unit 134 via the contact part 136 and the contact part 116.

Furthermore, the detection unit 118a detects the power-supply turn-on signal for notifying that the power supply of the information display unit 130 is on, and detects a power-supply operation signal.

When the operation unit 113 described above in FIG. 8 accepts a power-supply operation of operating the state of the power supply of the input operation unit 110, a power-supply operation signal that may be substantially identical to the power-supply turn-on signal for notifying that the power supply of the information display unit 130 is on is output to the detection unit 118a.

When the power-supply operation signal is detected by the detection unit 118a, the power-supply unit 118 switches on the power supply of the input operation unit 110.

As a result, since the signal identical to that when power-supply operation using the operation unit 113 is performed by the user is used for the power-supply turn-on signal, the functions of the portable terminal apparatus 100 may be simplified.

When the power supply of the information display unit 130 is off, the control unit 134 causes the path switching unit 135 to perform switching such that the contact part 136 and the detection unit 138a are electrically connected to each other.

Furthermore, when the power supply of the information display unit 130 is on, the control unit 134 transmits a power-supply turn-on signal for notifying that the power supply of the information display unit 130 is on, and causes the path switching unit 135 to switch to a state in which the contact part 136 and the detection unit 138a are not electrically connected to each other and the contact part 136 and the control unit 134 are electrically connected to each other.

Furthermore, the control unit 134 detects the power-supply turn-on signal for notifying that the power supply of the input operation unit 110 is on, the power-supply turn-on signal being transmitted from the control unit 114 via the contact part 136 and the contact part 136.

When the power supply of the information display unit 130 is on and the communication is stopped, the control unit 134 transmits a power-supply turn-on signal for notifying that the power supply of the information display unit 130 is on via a communication line, and detects the power-supply turn-on signal for notifying that the power supply of the information display unit 130 is on.

As a result, it is possible to notify the states of each other's power supplies of the input operation unit 110 and the information display unit 130 and confirm the states of each other's power supplies.

The path switching unit 135 is capable of performing switching such that the contact part 136 and the detection unit 138a are electrically connected or not electrically connected to each other.

As a result, when it is not desired for the detection unit 138a to detect the power-supply turn-on signal, since the detection unit 138a is disconnected from the contact part 136, it is possible to prevent the control unit 134 and the detection unit 138a from being connected to each other.

Furthermore, it is possible for the path switching unit 135 to perform switching between a state in which the contact part 136 and the detection unit 138a are electrically connected to each other and a state in which the contact part 136 and the control unit 134 are electrically connected to each other.

As a result, when the power supply of the information display unit 130 is off, the detection unit 138a is connected to the input operation unit 110, and when the power supply of the information display unit 130 is on, the control unit 134 is connected to the input operation unit 110.

The contact part 116 may be electrically connected to the contact part 136 in the manner described above.

The conversion unit 137 converts the power-supply turn-on signal that is transmitted from the control unit 114 in the manner described above into a form of signal that may be received by the detection unit 138a.

When the power-supply turn-on signal for notifying that the power supply of the input operation unit 110 is on is detected by the detection unit 138a, the power-supply unit 138 switches on the power supply of the information display unit 130.

As a result, the power supply of the information display unit 130 is controlled in accordance with the state of the power supply of the input operation unit 110.

Furthermore, the power-supply unit 138 includes a detection unit 138a.

The power-supply unit 138 is not limited to this, and the detection unit 138a may be provided independently of the power-supply unit 138.

Furthermore, when at least one of the power-supply turn-on signal for notifying that the power supply of the input operation unit 110 is on and the power-supply operation signal is detected by the detection unit 138a, the power-supply unit 138 switches on the power supply of the information display unit 130.

When the power-supply turn-on signal for notifying that the power supply of the input operation unit 110 is on is not detected by the control unit 134, the power-supply unit 138 switches off the power supply of the information display unit 130.

Furthermore, when the power-supply turn-on signal for notifying that the power supply of the input operation unit 110 is on is detected by the control unit 134, the power-supply unit 138 maintains the power supply of the information display unit 130 to be on.

As a result, it is possible for the input operation unit 110 and the information display unit 130 to confirm the states of each other's power supplies and control the states of the power supplies in accordance with the confirmation result.

When the power supply of the input operation unit 110 is off and the communication is stopped, the detection unit 138a detects a first power-supply turn-on signal that is received from the control unit 114 via the contact part 116 and the contact part 136.

Furthermore, the detection unit 138a detects the power-supply turn-on signal for notifying that the power supply of the input operation unit 110 is on, and detects a power-supply operation signal.

When the operation unit 133 described above in FIG. 8 accepts power-supply operation of operating the state of the power supply of the information display unit 130, a power-supply operation signal that may be substantially identical to the power-supply turn-on signal for notifying that the power supply of the input operation unit 110 is on is output to the detection unit 138a based on the received power-supply operation.

When the power-supply operation signal is detected by the detection unit 138a, the power-supply unit 138 switches on the power supply of the information display unit 130.

As a result, since a signal that may be substantially identical to that when a power-supply operation is performed using the operation unit 133 by the user is used for the power-supply turn-on signal, the functions of the portable terminal apparatus 100 may be simplified.

In the present embodiment, the states of the power supplies of the facing devices are confirmed by using general purpose input/output (GPIO) in the terminals of the central processing units (CPUs) possessed by the control units 114 and 134, and the states of the power supplies themselves are notified.

In the control units 114 and 134, a transmission line TX, a reception line RX, and two lines within the GPIO are each in a wired OR connection.

When the transmission line TX and the reception line RX are not used, by making GPIO operative, the functions of confirming the states of the power supplies of the facing devices and notifying the states of the power supplies themselves are activated.

When the power supply of the input operation unit 110 is on, under the control of the control unit 114, the dotted line (line that connects the control unit 114 and the contact part 116 to each other) in the path switching unit 115 becomes operative.

Similarly, when the power supply of the information display unit 130 is on, under the control of the control unit 134, the dotted line (line that connects the control unit 134 and the contact part 136 to each other) in the path switching unit 135 becomes operative.

When the power supply of the input operation unit 110 is off, under the control of the control unit 114, the solid line (line that connects the contact part 116 and the conversion unit 117 to each other) in the path switching unit 115 becomes operative.

Similarly, when the power supply of the information display unit 130 is off, under the control of the control unit 134, the solid line (line that connects the contact part 136 and the conversion unit 117 to each other) in the path switching unit 135 becomes operative.

As a result, if both the power supplies of the input operation unit 110 and the information display unit 130 are on, the individual units monitor the states of each other's power supplies.

That is, if the power supply of one of them (for example, the input operation unit 110) is on and the power supply of the other (for example, the information display unit 130) is off, the control unit (for example, the control unit 114) on the side in which the power supply is on and the detection unit (for example, the detection unit 138a) on the side in which the power supply is off are connected to each other.

Therefore, the power-supply turn-on signal from the control unit of the device whose power supply is on is detected by the detection unit of the device whose power supply is off.

Based on this detection, the power supply of the device whose power supply is off is controlled to be on.

Furthermore, if both the power supplies of the input operation unit 110 and the information display unit 130 are on, after one of the power supplies is changed to on, the power supply of the other device is controlled to be on in a similar manner.

In accordance with this, by performing power-supply operation of one of the devices by the user, the power supplies of the input operation unit 110 and the information display unit 130 in an integrated state are controlled to be on.

In the present embodiment, the input operation unit 110 and the information display unit 130 include path switching units 115 and 135, respectively. The input operation unit 110 and the information display unit 130 are not limited to these, and externally provided path changeover switches may be provided so as to realize the same functions.

Furthermore, in the present embodiment, the operation input unit 110 and the information display unit 130 include the control units 114 and 134, the path switching units 115 and 135, and the detection units 118a and 138a, respectively.

However, the operation input unit 110 and the information display unit 130 are not limited to these, and each of the operation input unit 110 and the information display unit 130 may be provided with a power-supply control apparatus having the functions of the control unit 114, the path switching unit 115, and the detection unit 118a so as to realize the same functions.

Figure 10:
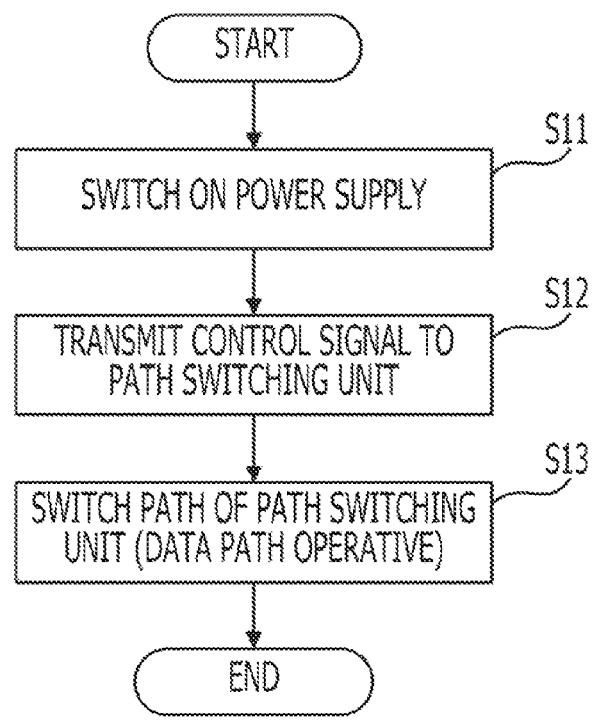
FIG. 10 is a flowchart illustrating a power-supply turn-on process of the second embodiment.

FIG. 10 is a flowchart illustrating a power-supply turn-on process according to the second embodiment.

The power-supply turn-on process is a process in which the path of the path switching unit 115 or the path switching unit 135 is switched when the power supply of the input operation unit 110 or the information display unit 130 is changed from off to on.

In the following, the power-supply turn-on process illustrated in FIG. 10 will be described along the step number of the flowchart.

The power-supply turn-on process is started, for example, when the power supply of the input operation unit 110 or the information display unit 130 is controlled to be on, such as, for example, the power-supply button being operated by the user when the power supply is off.

Here, a case in which the power-supply turn-on process is performed by the input operation unit 110 will be described. The same also applies to the case in which the power-supply turn-on process is performed by the information display unit 130. Thus, repeated description thereof is omitted.

[Step S11] The power-supply unit 118 controls the power supply of the input operation unit 110 to be on.

[Step S12] The control unit 114 transmits, to the path switching unit 115, a control signal (keep alive signal) for performing control such that the connection state is switched when the power supply is on by notifying that its power supply is on.

[Step S13] Based on the detection of the control signal, the path switching unit 115 switches the path to a state in which the control unit 114 and the contact part 116 are connected to each other.

As a result, the power-supply turn-on signal that is transmitted from the control unit 114 when the power supply of the input operation unit 110 is on becomes transmissible to the information display unit 130 via the contact parts 116 and 136. Thus, the control unit 114 enables control of switching on the power supply of the information display unit 130.

Furthermore, the communication data that is transmitted from the control unit 114 becomes possible to be transmitted to the information display unit 130 via the contact parts 116 and 136. Thus, if the power supply of the information display unit 130 is on, the data path between the input operation unit 110 and the information display unit 130 becomes operative.

In the manner described above, when the power supply of the input operation unit 110 is on, under the control of the control unit 114, the path switching unit 115 switches the path so as to connect the control unit 114 and the contact part 116 to each other.

When the power supply of the information display unit 130 is on, similarly, under the control of the control unit 134, the path switching unit 135 switches the path so as to connect the control unit 134 and the contact part 136 to each other.

As a result, the power-supply turn-on operation of the facing devices is made possible.

Figure 11:
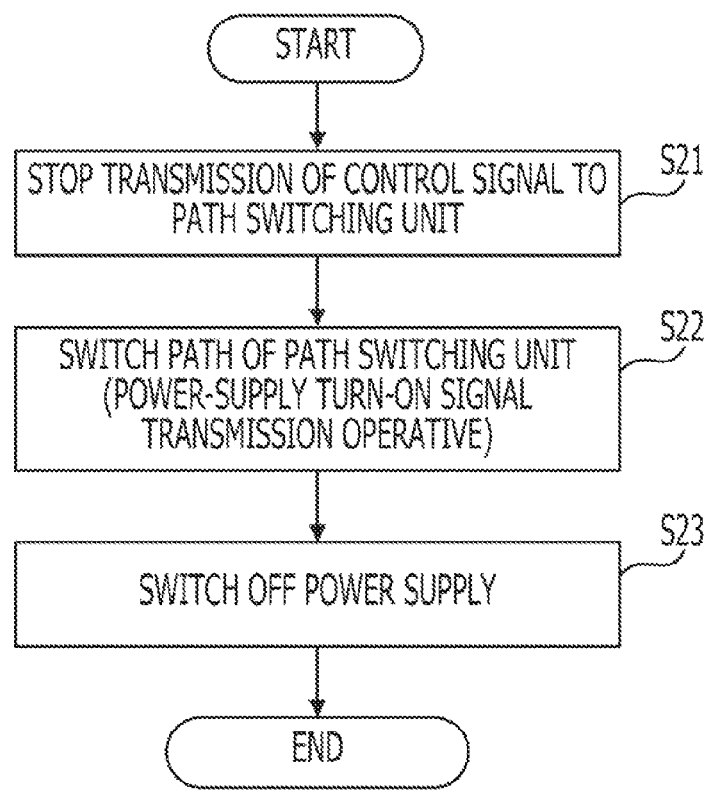
FIG. 11 is a flowchart illustrating a power-supply turn-off process of the second embodiment.

FIG. 11 is a flowchart illustrating a power-supply turn-off process according to the second embodiment.

The power-supply turn-off process is a process in which the path of the path switching unit 115 or the path switching unit 135 is switched when the power supply of the input operation unit 110 or the information display unit 130 is changed from on to off.

In the following, the power-supply turn-off process illustrated in FIG. 11 will be described along the step number of the flowchart.

The power-supply turn-off process is started, for example, when the power supply of the input operation unit 110 or the information display unit 130 is controlled to be off, such as a power-supply button being operated by the user when the power supply is on.

Here, a case in which the power-supply turn-off process is performed by the input operation unit 110 will be described. The same also applies to the case in which the power-supply turn-off process is performed by the information display unit 130 and thus, repeated description thereof is omitted.

[Step S21] The control unit 114 stops the transmission of a control signal to the path switching unit 115.

[Step S22] Based on the detection of the stop of the control signal, the path switching unit 115 switches the path from a state in which the control unit 114 and the contact part 116 are connected to each other to a state in which the conversion unit 117 and the contact part 116 are connected to each other.

As a result, it becomes possible for the detection unit 118a to detect, via the conversion unit 117 and the contact parts 116 and 136, the power-supply turn-on signal that is transmitted from the control unit 134 when the power supply of the information display unit 130 is on.

Furthermore, as a result of the connection between the control unit 114 and the contact part 116 being cut, the data path between the input operation unit 110 and the information display unit 130 becomes inoperative.

[Step S23] The power-supply unit 118 controls the power supply of the input operation unit 110 to be off.

In the manner described above, when the power supply of the input operation unit 110 is off, under the control of the control unit 114, the path switching unit 115 switches the path so as to connect the detection unit 118a and the contact part 116 to each other.

When the power supply of the information display unit 130 is on, similarly, under the control of the control unit 134, the path switching unit 135 switches the path so as to connect the detection unit 138a and the contact part 136 to each other.

Figure 12:
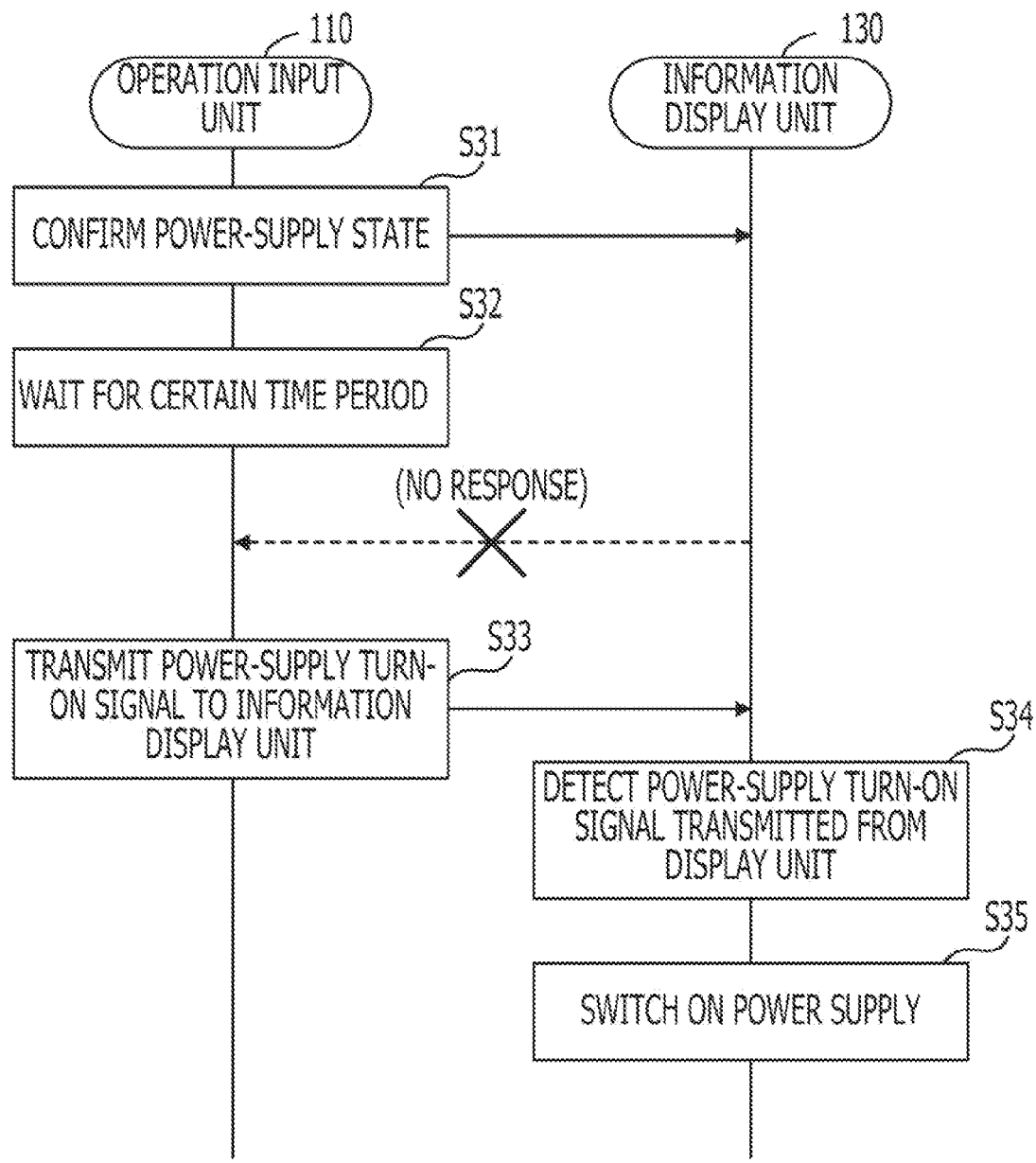
FIG. 12 is a sequence diagram illustrating the flow of the processing of an input operation unit and an information display unit when the power supply is on according to the second embodiment.

FIG. 12 is a sequence diagram illustrating the flow of the processing of the input operation unit and the information display unit when the power supply is on according to the second embodiment.

In the present embodiment, when the power supply of one of the units (for example, the input operation unit 110) is on, and the power supply of the other device (for example, the information display unit 130) is off, the input operation unit 110 whose power supply is on performs control of switching on the power supply of the information display unit 130 whose power supply is off.

In the following, the processing illustrated in FIG. 12 will be described along the step number of the sequence diagram.

The following processing is started, for example, when one of the devices, whose power supply is on, detects that the power supply of the other device is off, and the power supply of the other device is controlled to be on.

Here, a case in which the power supply of the input operation unit 110 is on and the power supply of the information display unit 130 is off will be described. However, the same also applies to a case in which the power supply of the input operation unit 110 is off and the power supply of the information display unit 130 is on. Thus, repeated description thereof is omitted.

[Step S31] The control unit 114 possessed by the input operation unit 110 confirms the state of the power supply of the information display unit 130.

At this time, the control unit 114 transmits a confirmation signal, such as test data, for confirming the state of the power supply of the information display unit 130, to the information display unit 130 via the path switching units 115 and 135 and the contact parts 116 and 136.

If the power supply of the information display unit 130 is on when this confirmation signal is received, the information display unit 130 transmits a response signal to the input operation unit 110.

[Step S32] The control unit 114 waits for a certain time period (for example, one second) in order to confirm the presence or absence of the response signal for the confirmation signal transmitted in step S31.

If the response signal from the information display unit 130 is detected within the certain time period by the control unit 114, since the power supply of the information display unit 130 is on, the subsequent processing is not performed.

[Step S33] If the response signal from the information display unit 130 is not detected within the certain time period in step S32, the control unit 114 transmits, to the information display unit 130, a power-supply turn-on signal for controlling the power supply of the information display unit 130 to be on.

At this time, since the control unit 114 and the contact part 116 are connected to each other by the path switching unit 115, the control unit 114 may be connected to the information display unit 130.

[Step S34] The detection unit 138a possessed by the information display unit 130 detects the power-supply turn-on signal transmitted from the control unit 114 in step S33.

At this time, the conversion unit 137 converts the power-supply turn-on signal transmitted from the control unit 114 into a form of signal that may be detected by the detection unit 138a.

By detecting the power-supply turn-on signal converted by the conversion unit 137, the detection unit 138a detects that the power supply of the input operation unit 110 is on.

[Step S35] The power-supply unit 138 possessed by the information display unit 130 controls the power supply of the information display unit 130 to be on.

In the above description, the control unit 114 transmits a confirmation signal in order to confirm the state of the power supply of the information display unit 130.

However, the control unit 114 is not limited to this, and the control unit 114 may confirm the state of the power supply of the information display unit 130 by monitoring the terminal state of the contact part 136 of the information display unit 130.

More specifically, it is possible to confirm the state of the power supply of the facing devices by using GPIO in the terminals of the CPUs possessed by the control units 114 and 134, and it is possible to notify the states of the power supplies themselves.

The state of the power supply is specified in such a manner that the power supply is on when a low-level voltage is output between the connection terminals of the contact parts 116 and 136.

As a result of being specified in the manner described above, it is possible to determine that the power supply is on when a low-level voltage is detected in the connection terminals of the contact parts 116 and 136, and that the power supply is off when a high-level voltage is detected therein.

For example, if a low-level voltage is detected from the connection terminals 116a and 116b of the contact part 116, the power supply of the input operation unit 110 is on.

Furthermore, if a high-level voltage is detected from the connection terminals 116a and 116b of the contact part 116, the power supply of the input operation unit 110 is off.

Similarly, if a low-level voltage is detected from the connection terminals 136a and 136b of the contact part 136, the power supply of the information display unit 130 is on.

Furthermore, if a high-level voltage is detected from the connection terminals 136a and 136b of the contact part 136, the power supply of the information display unit 130 is off.

In the manner described above, when the power supply of the input operation unit 110 is on, the control unit 114 enables the state of the power supply of the information display unit 130 to be confirmed.

When the confirmation result indicates that the power supply of the information display unit 130 is off, the power-supply turn-on signal from the control unit 114 is detected by the detection unit 138a. Furthermore, based on this signal, the power-supply unit 138 controls the power supply of the information display unit 130 to be on.

When the power supply of the information display unit 130 is on, similarly, the control unit 134 enables the state of the power supply of the input operation unit 110 to be confirmed.

When the confirmation result indicates that the power supply of the input operation unit 110 is off, the power-supply turn-on signal from the control unit 134 is detected by the detection unit 118a. Furthermore, based on this signal, the power-supply unit 118 controls the power supply of the input operation unit 110 to be on.

In the present embodiment, the case in which the power supply is on has been described as an example.

It is also possible for the portable terminal apparatus 100 according to the present embodiment to perform power-supply turn-off control in a manner similar to power-supply turn-on control.

As has been described above, according to the portable terminal apparatus 100 of the second embodiment, it is possible to control, with one of the units, the power supply of the other unit.

Furthermore, without using a communication function, the states of each other's power supplies are mutually monitored, and control signals for power-supply control are transmitted and received.

As a result, also, when one of the units continues to monitor whether the power supply of the other unit becomes on while the one device remains in the standby state, it is possible to reduce standby power corresponding to the amount used by the communication function.

Furthermore, since a communication line is used to confirm the state of the power supply, it is possible for one of the units to confirm the state of the power supply of the other unit without increasing the number of wired connections for both.

As a result, it is possible to reduce an increase in the number of contact parts between the input operation unit 110 and the information display unit 130, and it is possible to reduce the deterioration of the degree of freedom of the design of the exterior of the portable terminal apparatus 100.

Here, in the present embodiment, a description has been given by using a portable terminal apparatus as an example. This is an example, and the present invention may be applied to any electronic apparatus that may be separated into sub-units.

Examples of applicable electronic apparatuses include a mobile phone, a portable television set, a portable games machine, an electronic dictionary device, a notebook computer, and a PDA, which may be separated into a main body and a cradle. However, the examples are not limited to these.

Furthermore, the cradle may have, for example, a function of charging the main body, a function of reading and writing information with the main body by communication with the main body, and a function of displaying the read information.

In the foregoing, the electronic apparatus, the power-supply control apparatus, and the power-supply control method disclosed have been described in accordance with the embodiments illustrated. The foregoing simply represents the principles of the present invention.

Many modifications and changes are possible for the disclosed technology by a person skilled in the art. The disclosed technology is not limited to the exact configuration and application examples that have been illustrated and described above. The configuration of each unit may be replaced with any configuration having substantially similar functions.

Furthermore, any other structural elements or processes may be added to the disclosed technology.

Furthermore, the disclosed technology may be a combination of any two or more configurations from among the above-described embodiments.

Furthermore, all the modifications and equivalents corresponding to the disclosed technology are regarded as falling within the scope of the present invention defined by the attached claims and the equivalents thereof.

What is claimed is:

1. A method of controlling a power supply of an electronic apparatus coupled to another electronic apparatus, the method comprising:
    switching to select a first path electrically connecting a contact part of the electronic apparatus and a detection circuit of the electronic apparatus when the power supply of the electronic apparatus is off, and to select a second path electrically disconnecting the contact part and the detection circuit when the power supply of the electronic apparatus is on, the contact part being configured to electrically connect to the other electronic apparatus, and the detection circuit being configured to receive via the electrically connected contact part a signal representing a state of the power supply of the other electronic apparatus and configured not to transmit a signal via the electrically connected contact part; and
    controlling the power supply of the electronic apparatus when the signal representing the state of the power supply of the other electronic apparatus is detected by the detection circuit.

2. The method according to claim 1, further comprising:
turning on the power supply of the electronic apparatus when the signal representing the state of the power supply of the other electronic apparatus is detected by the detection circuit.

3. The method according to claim 1, wherein
the first path electrically disconnects the contact part and a processor of the electronic apparatus, the second path electrically connects the contact part and the processor, and the processor is configured to receive and transmit a signal via the electrically connected contact part.

4. The method according to claim 3, further comprising:
when the processor receives via the electrically connected contact part a signal representing that the power supply of the other electronic apparatus is on, performing detection of a signal via the electrically connected contact part; and
turning off the power supply of the electronic apparatus when the signal via the electrically connected contact part is not detected within a specified time by the detection.

* * * * *

UNITED STATES PATENT AND TRADEMARK OFFICE
CERTIFICATE OF CORRECTION

| | | |
|---|---|---|
| PATENT NO. | : 8,599,538 B2 | Page 1 of 1 |
| APPLICATION NO. | : 12/917589 | |
| DATED | : December 3, 2013 | |
| INVENTOR(S) | : Kondou | |

It is certified that error appears in the above-identified patent and that said Letters Patent is hereby corrected as shown below:

On the title page, Item [30] Foreign Application Priority Data should read

-- Nov. 4, 2009   (JP) ................................2009-253048 --

Signed and Sealed this
Fifteenth Day of April, 2014

Michelle K. Lee
*Deputy Director of the United States Patent and Trademark Office*